(12) United States Patent
Markert

(10) Patent No.: US 12,235,132 B2
(45) Date of Patent: Feb. 25, 2025

(54) ROTATION DETECTION DEVICE

(71) Applicant: SUMITOMO HEAVY INDUSTRIES, LTD., Tokyo (JP)

(72) Inventor: Sebastian Markert, Markt Indersdorf (DE)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 90 days.

(21) Appl. No.: 18/169,885

(22) Filed: Feb. 16, 2023

(65) Prior Publication Data

US 2023/0266148 A1  Aug. 24, 2023

(30) Foreign Application Priority Data

Feb. 22, 2022 (JP) ................. 2022-025981

(51) Int. Cl.
*G01D 5/14* (2006.01)
*G01B 7/30* (2006.01)

(52) U.S. Cl.
CPC ............. *G01D 5/14* (2013.01); *G01B 7/30* (2013.01)

(58) Field of Classification Search
CPC .................. G01D 5/14; G01B 7/30
See application file for complete search history.

(56) References Cited

U.S. PATENT DOCUMENTS

| 7,637,019 | B2 | 12/2009 | Brandl |
| 2008/0164866 | A1* | 7/2008 | Steinich .......... G01D 5/08 324/207.2 |
| 2012/0112742 | A1 | 5/2012 | Schrader |
| 2020/0232820 | A1 | 7/2020 | Rosenegger et al. |

FOREIGN PATENT DOCUMENTS

| CN | 107131893 B | * | 6/2019 | ............ G01D 5/142 |
| DE | 102009054521 A1 | | 2/2011 | |
| EP | 1927823 B1 | | 3/2013 | |
| JP | 2011112441 A | * | 6/2011 | |
| JP | 2021097430 A | | 6/2021 | |
| WO | 2008084758 A1 | | 7/2008 | |
| WO | 2008136169 A1 | | 11/2008 | |

* cited by examiner

*Primary Examiner* — Walter L Lindsay, Jr.
*Assistant Examiner* — Milton Gonzalez
(74) *Attorney, Agent, or Firm* — HEA Law PLLC

(57) ABSTRACT

A rotation detection device includes a housing that accommodates a rotating body, a detected part that rotates integrally with the rotating body, a detection part that faces the detected part in an axial direction with an axial gap interposed therebetween, an installation member on which the detection part is installed, a female screw portion that is provided in one of the housing and the installation member, and a male screw portion that is provided in the other of the housing and the installation member and screwed into the female screw portion.

11 Claims, 15 Drawing Sheets

ROTATION DETECTION DEVICE

RELATED APPLICATIONS

The content of Japanese Patent Application No. 2022-025981, on the basis of which priority benefits are claimed in an accompanying application data sheet, is in its entirety incorporated herein by reference.

BACKGROUND

Technical Field

Certain embodiments of the present invention relate to a rotation detection device.

Description of Related Art

The related art discloses a rotation detection device that includes a detected part that rotates integrally with a rotating body, a detection part that faces the detected part in an axial direction, and an installation member on which the detection part is installed.

SUMMARY

According to an embodiment of the present invention, there is provided a rotation detection device including a housing that accommodates a rotating body, a detected part that rotates integrally with the rotating body, a detection part that faces the detected part in an axial direction with an axial gap interposed therebetween, an installation member on which the detection part is installed, a female screw portion that is provided in one of the housing and the installation member, and a male screw portion that is provided in the other of the housing and the installation member and screwed into the female screw portion.

DETAILED DESCRIPTION

Figure 1:
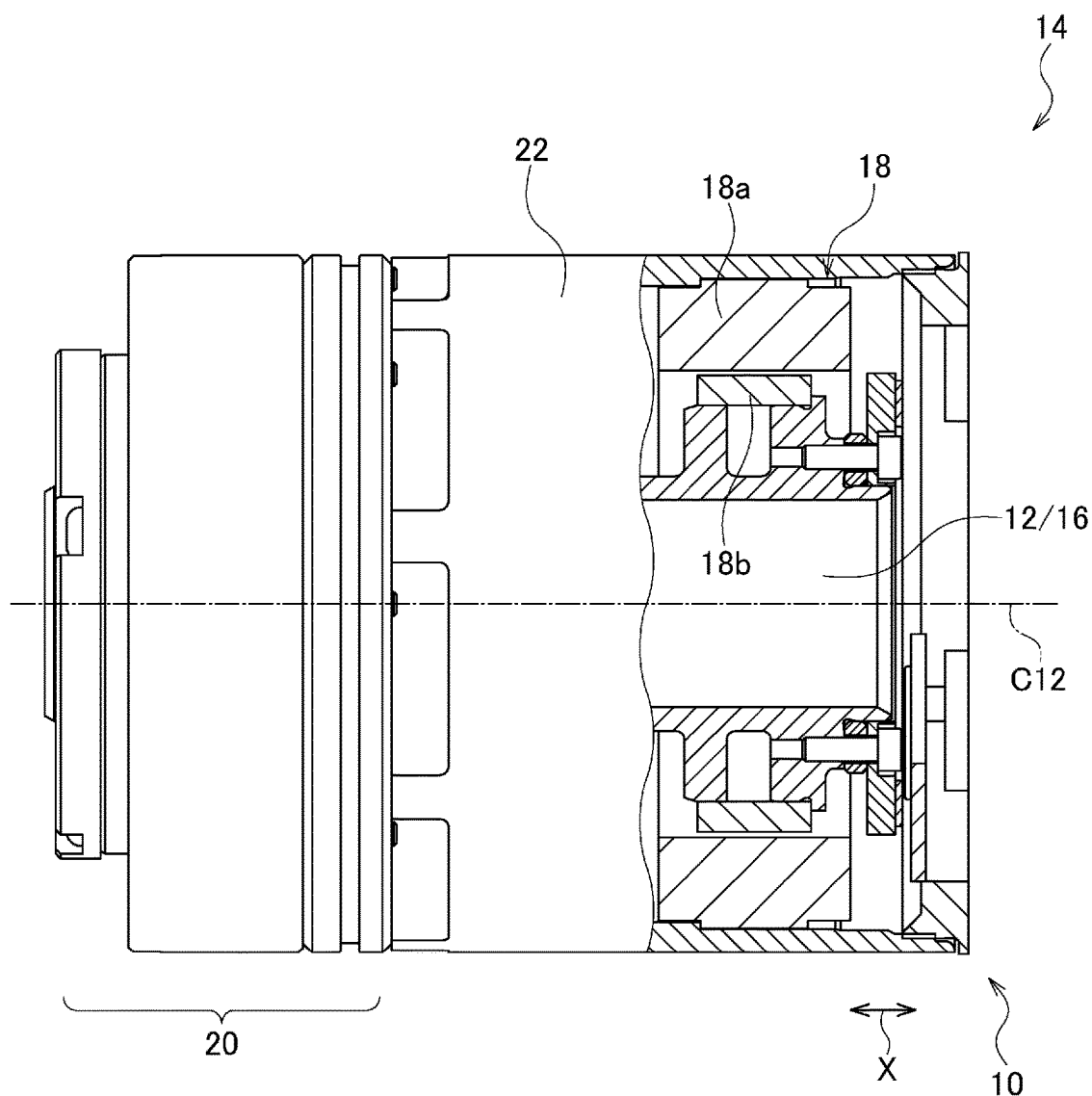
FIG. 1 is a side view showing a partial cross section of a rotary machine of one embodiment.

In order to obtain the target detection characteristics of the rotation detection device, there is a case where it is necessary to adjust the interval of the axial gap between the detection part and the detected part of the rotation detection device. The inventors of the present application have recognized that there is room for improvement in the related art in order to simplify the work of adjusting the interval of the axial gap.

It is desirable to provide a rotation detection device in which it is possible to simplify the work of adjusting the interval of an axial gap.

According to the present disclosure, it is possible to simplify the work of adjusting the interval of an axial gap.

Hereinafter, embodiments will be described. The same components are denoted by the same reference numerals, and overlapping description is omitted. In each drawing, for convenience of explanation, components are appropriately omitted, enlarged, or reduced. The drawings should be viewed according to the direction of a symbol.

One Embodiment

FIG. 1 is referred to. A rotation detection device 10 is used in a rotary machine 14 that includes a rotating body 12. Hereinafter, a direction along a rotation center line C12 of the rotating body 12 is referred to as an axial direction X, and a circumferential direction and a radial direction with respect to a circle centered on the rotation center line C12 are simply referred to as a circumferential direction and a radial direction.

The rotary machine 14 of the present embodiment is an actuator. The rotary machine 14 includes a rotor shaft 16 as the rotating body 12, a motor 18 that rotates the rotor shaft 16, a reduction gear 20 that decelerates the rotation of the rotor shaft 16 and outputs it to a driven member, and a housing 22 that accommodates the rotating body 12. The rotating body 12 is rotatably supported through bearings (not shown) incorporated in the rotary machine 14. The housing 22 of the present embodiment accommodates the motor 18 and the like, in addition to the rotating body 12. A specific example of the driven member is not particularly limited and is, for example, a part of a driven machine such as a conveyor, a vehicle wheel, a machine tool, or a robot (an industrial robot, a service robot, or the like).

The motor 18 of the present embodiment is a three-phase brushless DC motor. A specific example of the motor 18 is not particularly limited and may be, for example, a brushed DC motor, an AC motor (a permanent magnet motor, an induction motor, a reluctance motor, or the like), a coreless motor, or the like. The motor 18 includes a stator 18a that is fixed to the housing 22, and a rotor 18b that is rotatable integrally with the rotor shaft 16.

Figure 2:
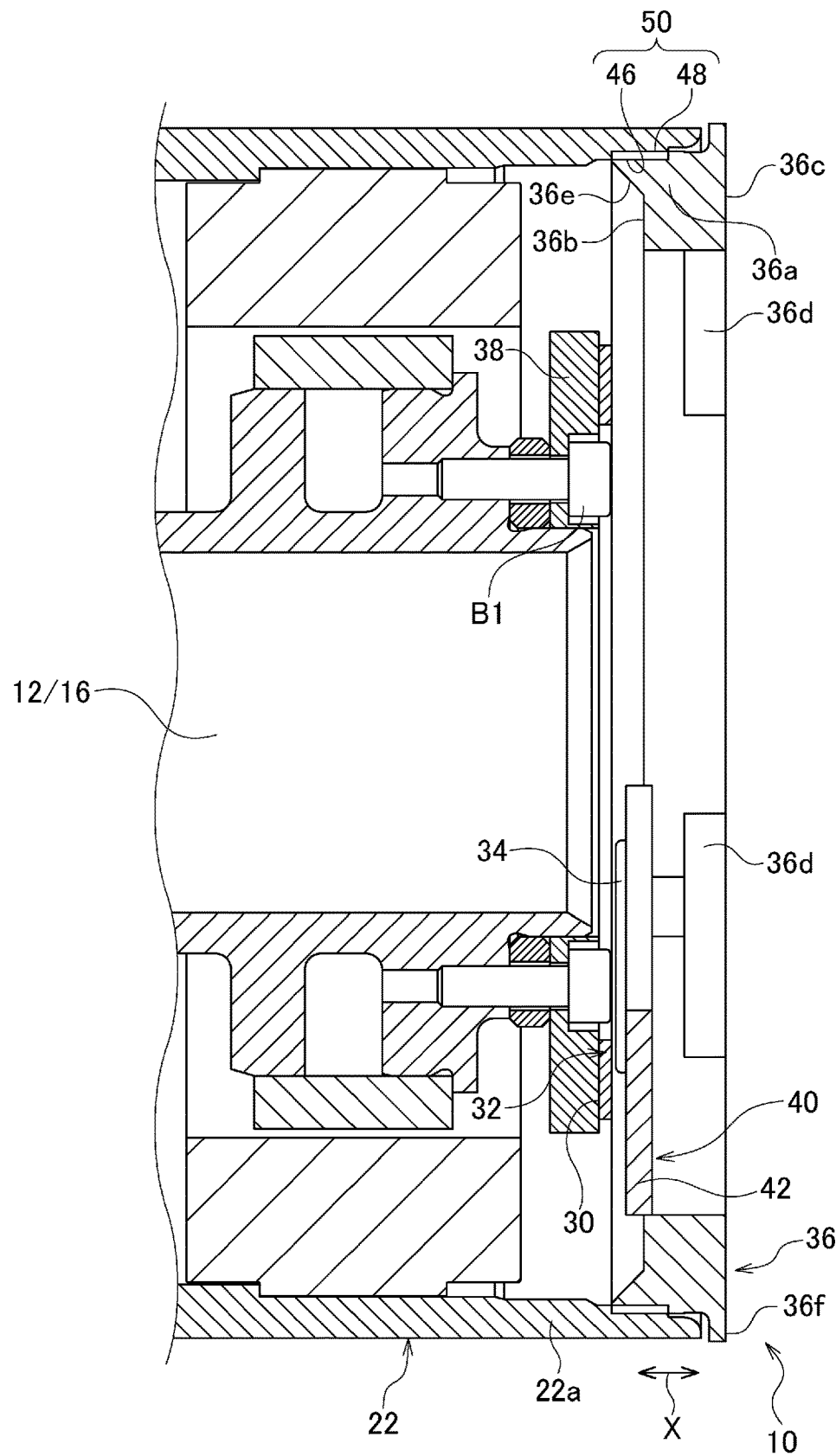
FIG. 2 is a side sectional view of a rotation detection device of one embodiment.
Figure 3:
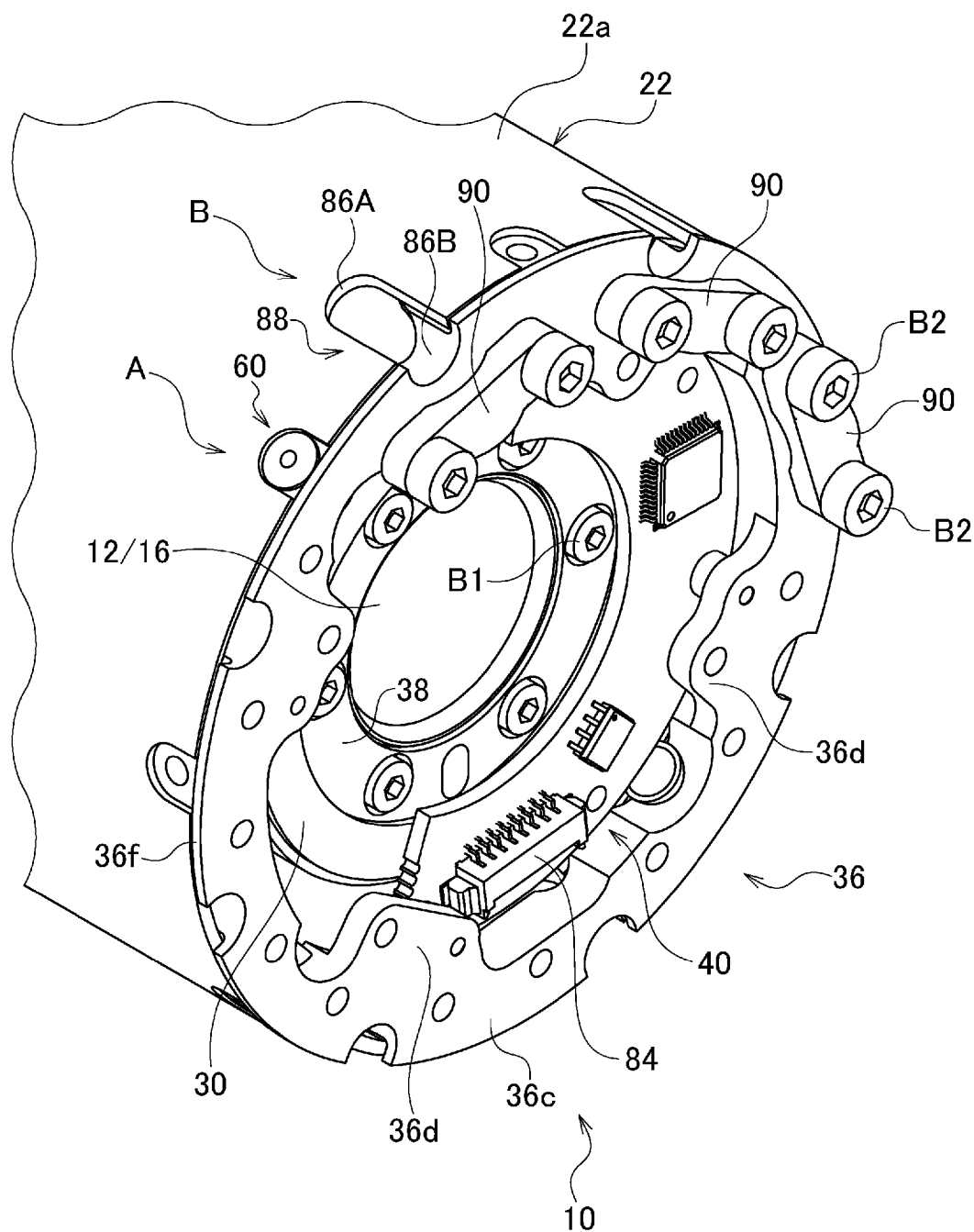
FIG. 3 is a perspective view of the rotation detection device of one embodiment.
Figure 4:
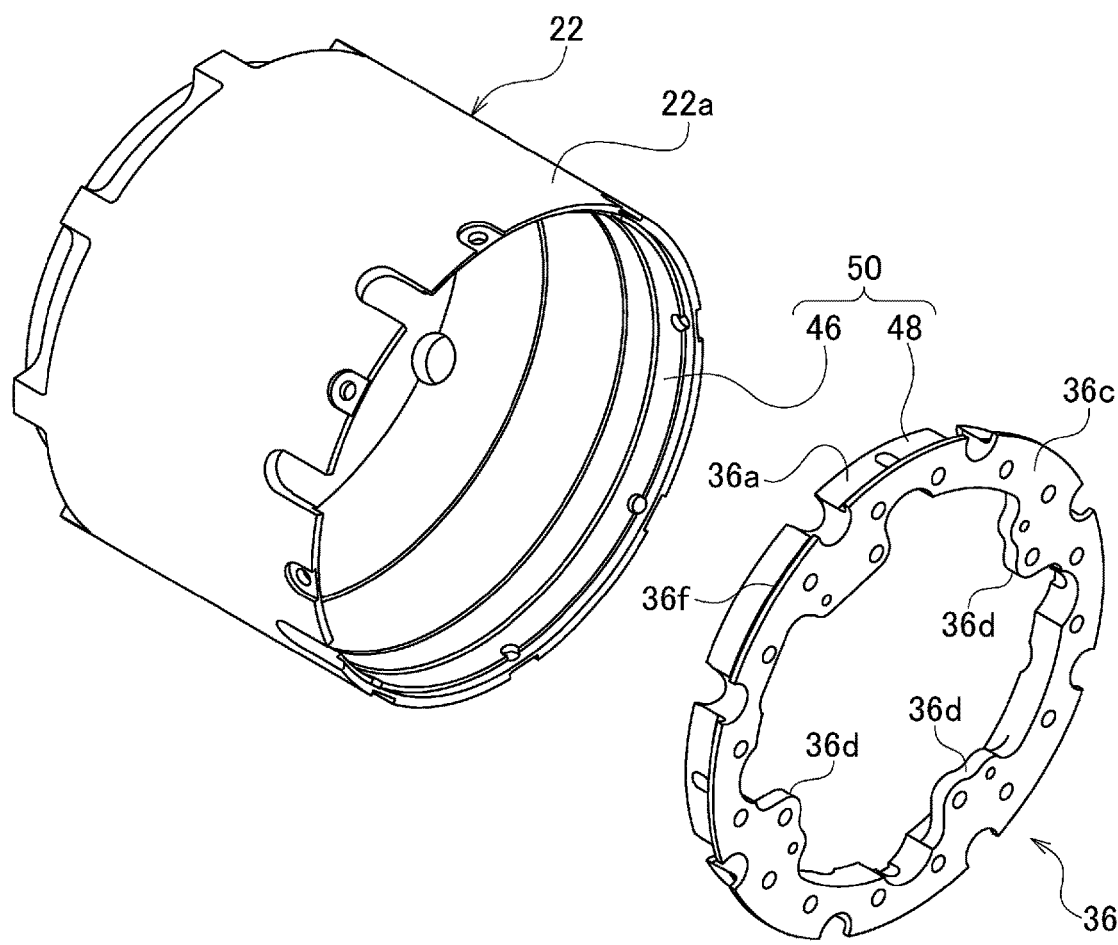
FIG. 4 is a perspective view of a housing and an installation member.

FIGS. 2, 3, and 4 are referred to. The rotation detection device 10 includes, in addition to the housing 22 described above, a detected part 30 that rotates integrally with the rotating body 12 (the rotor shaft 16), a detection part 34 that faces the detected part 30 with an axial gap 32 interposed therebetween in the axial direction X, and an installation member 36 on which the detection part 34 is installed. The housing 22 also serves as a part of the rotary machine 14.

The housing 22 is provided with a first peripheral wall portion 22a that has a tubular shape and is open toward one side in the axial direction.

The detected part 30 and the detection part 34 of the rotation detection device 10 configure a non-contact type rotary encoder. The rotary encoder of the present embodiment is a magnetic encoder in which the detection part 34 is a magnetic sensor and the detected part 30 is a magnetic scale. A specific example thereof is not particularly limited, and may be, for example, an optical encoder in which the detection part 34 is an optical sensor and the detected part 30 is an optical scale, or the like.

The detected part 30 is an annular scale such as a magnetic scale. The detected part 30 of the present embodiment is fixed to an annular hub 38 that is attached to the rotating body 12 by using bolts B1 or the like. The detected part 30 of the present embodiment is accommodated in the housing 22.

The detection part 34 can detect the rotation of the rotating body 12 by detecting a change in a predetermined physical quantity (a magnetic field, the amount of light, or the like) when the detected part 30 rotates together with the rotating body 12. The detection part 34 of the present embodiment is a sensor IC (IC: Integrated Circuit) having a built-in sensor element (magnetic sensitive element or the like) that detects a predetermined physical quantity and converts it into an electric signal. This sensor IC can generate a detection signal indicating the rotation state (the rotation angle or the like) of the rotating body 12 as a detection result thereof by processing the detected electric signal of the sensor element.

In a case of using such a rotary encoder, the detection characteristics by the detection part 34 vary according to the interval of the axial gap 32. For example, in a case where a magnetic encoder is used as in the present embodiment, the density, direction, or the like of a magnetic flux that is emitted from the detected part 30 (a magnetic scale) varies according to the interval of the axial gap 32. Accordingly, signal strength that can be detected by the detection part 34 (a sensor element) changes, so that the detection characteristics vary.

The detection part 34 is a part of a detection unit 40. The detection unit 40 includes, in addition to the detection part 34, a circuit board 42 on which the detection part 34 is mounted. The circuit board 42 of the present embodiment has an arc shape.

The installation member 36 includes a second peripheral wall portion 36a provided at a position overlapping the first peripheral wall portion 22a of the housing 22 in the radial direction, an inner side surface portion 36b that is located on the detected part 30 side in the axial direction X (hereinafter also simply referred to as an axially inner side), an outer side surface portion 36c that is located on the side opposite to the detected part 30 in the axial direction X (hereinafter also simply referred to as an axially outer side), and an installed portion 36d on which the detection part 34 is installed. The inner side surface portion 36b is formed with a tapered portion 36e extending outward in the radial direction as it goes toward the axially inner side. The outer side surface portion 36c is formed with a flange portion 36f that protrudes outward in the radial direction from the second peripheral wall portion 36a and faces an opening end portion of the housing 22 in the axial direction X. The installed portion 36d is configured by a protrusion portion that protrudes inward in the radial direction from the second peripheral wall portion 36a. The detection part 34 is installed on the installed portion 36d of the present embodiment through another component (the circuit board 42) of the detection unit 40.

The rotation detection device 10 includes a female screw portion 46 provided in the housing 22, and a male screw portion 48 provided in the installation member 36. The female screw portion 46 is provided in an inner peripheral portion of the first peripheral wall portion 22a of the housing 22, and the male screw portion 48 is provided in an outer peripheral portion of the second peripheral wall portion 36a of the installation member 36. The female screw portion 46 is provided in an inner peripheral portion of a counter load side opening end portion in the first peripheral wall portion 22a of the housing 22. The male screw portion 48 is screwed into the female screw portion 46. The male screw portion 48 and the female screw portion 46 configure a screw mechanism 50. The relative positions in the axial direction of the housing 22 and the installation member 36 are changed by changing the amount of screwing of the male screw portion 48 with respect to the female screw portion 46. Accordingly, the relative positions in the axial direction of the rotating body 12 (the detected part 30) in the housing 22 and the detection part 34 installed on the installation member 36 are changed, so that the interval of the axial gap 32 between the detected part 30 and the detection part 34 can be adjusted.

Figure 5:
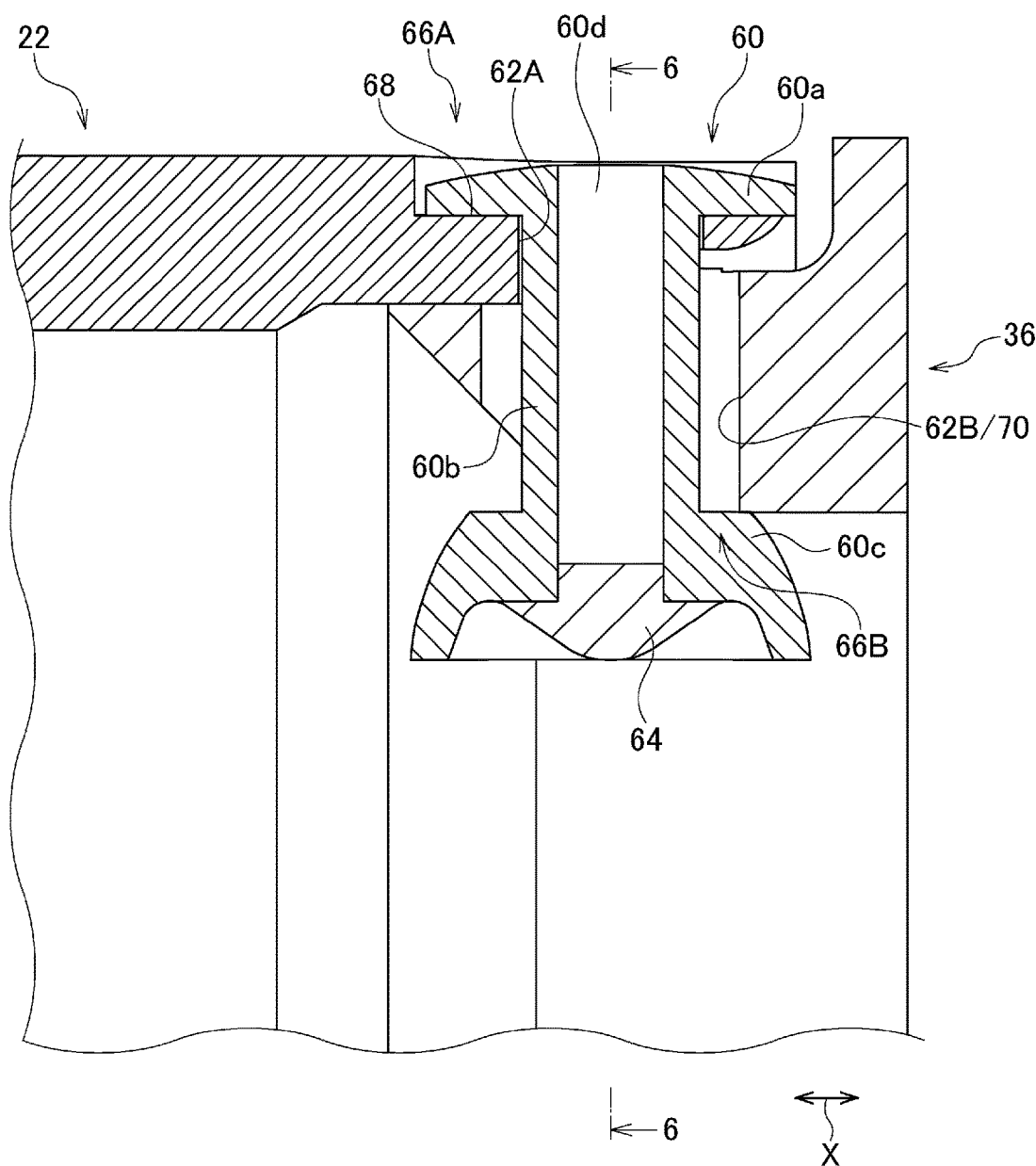
FIG. 5 is a sectional view around part A in FIG. 3.

FIG. 5 is referred to. FIG. 5 is a sectional view taken along line 5-5 in FIG. 6 which will be described later. The rotation detection device 10 includes a fixing member 60 that fixes the housing 22 and the installation member 36 so as not to be rotatable relative to each other, in a state where the axial gap 32 is provided between the detected part 30 and the detection part 34. The fixing member 60 fixes the housing 22 and the installation member 36 so as not to be movable relative to each other in the axial direction X by fixing the housing 22 and the installation member 36 so as not to be rotatable relative to each other.

The fixing member 60 of the present embodiment is an insertion member that is inserted into a first insertion hole 62A of the housing 22 and a second insertion hole 62B of the installation member 36. The fixing member 60 (the insertion member) of the present embodiment is a blind rivet as a fastening member that fastens the housing 22 and the installation member 36, that is, a rivet.

The fixing member 60 includes a shaft portion 60a that is inserted into the first insertion hole 62A and the second insertion hole 62B, a head portion 60b that sits on a peripheral edge portion of the insertion hole 62A on the outer side in the radial direction, and a coming-out restricting portion 60c that restricts coming-out of the fixing member 60 from the insertion holes 62A and 62B by coming into contact with a peripheral edge portion of the insertion hole 62B on the inner side in the radial direction. In a case where the fixing member 60 is a rivet, the coming-out restricting portion 60c is configured by a crimped portion that is provided at an end portion of the shaft portion 60a. In a case where the fixing member 60 serves as a blind rivet, the coming-out restricting portion 60c (the crimped portion) is provided by inserting a mandrel into a hollow hole 60d formed in the shaft portion 60a and pulling out the mandrel outward in the radial direction while breaking a mandrel head 64 thereof. A specific example of the coming-out restricting portion 60c is not particularly limited, and in a case where the fixing member 60 is a bolt, the coming-out restricting portion 60c may be configured by a nut or the like.

Mounting portions 66A and 66B for mounting the fixing member 60 are provided in the housing 22 and the installation member 36. The first mounting portion 66A is provided in the first peripheral wall portion 22a of the housing 22, and the second mounting portion 66B is provided in the second peripheral wall portion 36a of the installation member 36. The first mounting portion 66A includes the first insertion hole 62A into which the fixing member 60 is inserted. The second mounting portion 66B includes the second insertion hole 62B into which the fixing member 60 is inserted. In addition, the mounting portion 66A on the outer side in the radial direction includes a countersunk hole 68 in which the head portion 60b of the fixing member 60 sits. In the present embodiment, the first insertion hole 62A is a round hole, and the second insertion hole 62B is a long hole 70. The long hole 70 of the present embodiment extends with the axial direction X as a longitudinal direction thereof. The fixing member 60 of the present embodiment is mounted in the mounting portions 66A and 66B of the housing 22 and the installation member 36 in a state of being inserted into the first insertion hole 62A and the second insertion hole 62B.

Figure 6:
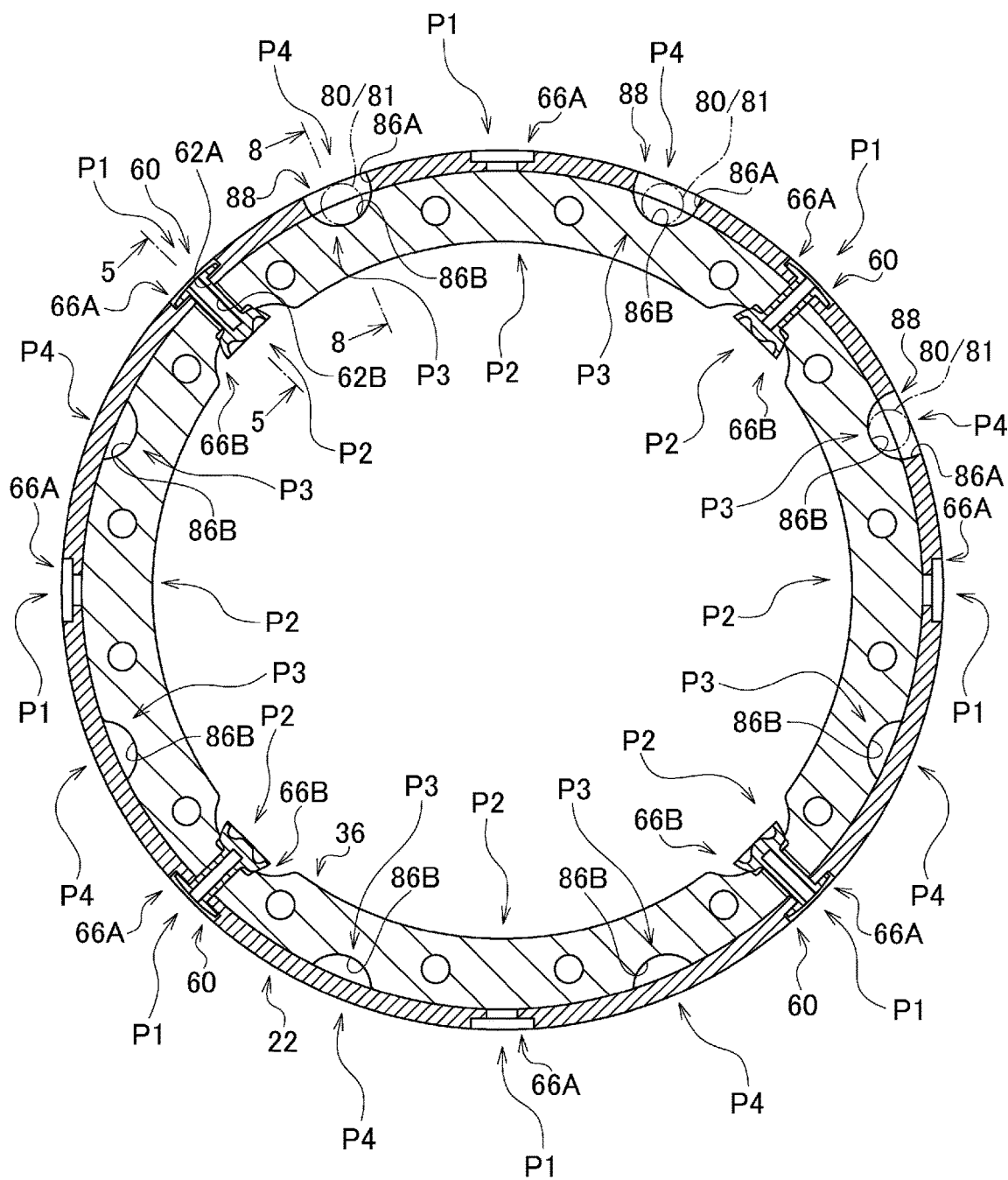
FIG. 6 is a sectional view taken along line 6-6 in FIG. 5.
Figure 7:
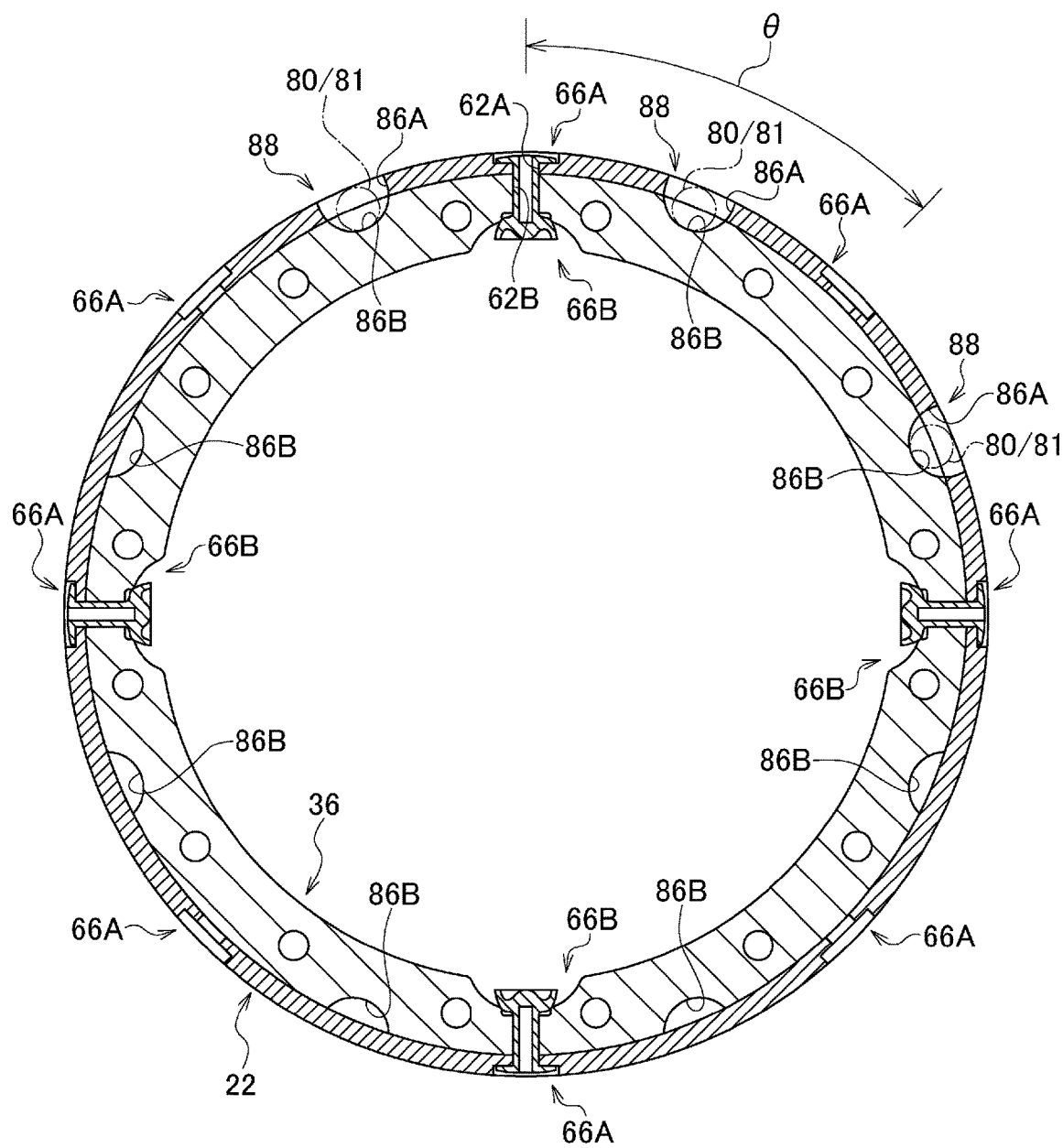
FIG. 7 is a sectional view showing a state in which the installation member is rotated from FIG. 6.

FIGS. 6 and 7 are referred to. FIG. 6 is a sectional view taken along line 6-6 in FIG. 5. FIG. 7 shows a state where the installation member 36 is rotated by a switching rotation angle θ (described later) from the state in FIG. 6. The housing 22 and the installation member 36 can be fixed by the fixing member 60 when the relative positions in the circumferential direction of the housing 22 and the installation member 36 are disposed at a fixable position. The fixable position is a position where the fixing member 60 can be mounted in the first mounting portion 66A of the housing 22 and the second mounting portion 66B of the installation member 36. The fixable position in the present embodiment is a position where the first insertion hole 62A of the first mounting portion 66A and the second insertion hole 62B of the second mounting portion 66B overlap in the radial direction in order for the fixing member 60 to be capable of being inserted.

The housing 22 and the installation member 36 of the present embodiment are configured such that the number of fixable positions that can be selected is plural (here, eight). In order to realize this, a plurality of mounting portions 66A or 66B of at least one of the housing 22 and the installation member 36 are provided at intervals in the circumferential direction. In the present embodiment, the housing 22 is provided with eight first mounting portions 66A, the number of which is the same as the number of fixable positions, and the installation member 36 is provided with four second mounting portions 66B. That is, in providing the plurality of first mounting portion 66A and the plurality of second mounting portion 66B, the number of the mounting portions on one side is smaller than the number of the mounting portions on the other side.

By rotating the housing 22 and the installation member 36 relative to each other, it is possible to sequentially switch the fixable position to be selected from among the plurality of fixable positions. The housing 22 and the installation member 36 of the present embodiment are configured such that the switching rotation angle θ for switching between such fixable positions is constant (here, 45°). In order to realize this, the mounting portions 66A or 66B (here, the first mounting portions 66A) of one of the housing 22 and the installation member 36 are provided at a first equiangular interval (here, 45°) which is the same as the switching rotation angle θ. The first mounting portion 66A is provided at each of a plurality of first equiangular positions P1 (here, a total of eight first equiangular positions P1) obtained by equally dividing 360° at the first equiangular intervals.

Further, the second mounting portions 66B of the installation member 36 are provided at at least some second equiangular positions P2 among a plurality of second equiangular positions P2 spaced at the first equiangular intervals. The plurality of second equiangular positions P2 are positions obtained by equally dividing 360° at the first equiangular intervals. In the present embodiment, the second mounting portions 66B are provided alternately at the plurality of second equiangular positions P2, and are provided in the installation member 36 at the equiangular intervals of 90°. In a case where the second mounting portions 66B are provided at two or more second equiangular positions P2 in this manner, a plurality of sets (here, four sets) of the first mounting portions 66A and second mounting portions 66B can be overlapped in the radial direction at any of the fixable positions.

In the rotation detection device 10, the interval of the axial gap 32 can be adjusted in stages by disposing the housing 22 and the installation member 36 at any fixable position among the plurality of fixable positions. The interval of the axial gap 32 has a size corresponding to the amount of screwing of the screw mechanism 50, and the larger the amount of screwing, the smaller the interval of the axial gap 32 becomes. The width of the interval that can be adjusted in stages by the rotation detection device 10 (the width from an interval at a step to an interval at the next step) is called an interval adjustment width. The interval adjustment width of the present embodiment is the value of "the screw pitch of the screw mechanism 50/the number of fixable positions". The screw pitch as referred to herein refers to an axial distance between adjacent screw threads of each of the male screw portion 48 and the female screw portion 46. For example, in a case where the screw pitch of the screw mechanism 50 is 1.0 mm and the number of fixable positions is eight, the interval adjustment width is 0.125 mm (=1.0 mm/8). That is, in the rotation detection device 10 of the present embodiment, the interval of the axial gap 32 can be adjusted in stages with the interval adjustment width on the order of millimeters (sub-millimeters). In order to change the interval adjustment width, it is sufficient if the screw pitch and the number of fixable positions are changed. The screw pitch, the number of fixable positions, and the interval adjustment width as referred to herein are merely examples, and specific examples thereof are not particularly limited.

The effects of the rotation detection device 10 described above will be described.

(A) The rotation detection device 10 includes the female screw portion 46 that is provided in the housing 22, and the male screw portion 48 that is provided in the installation member 36. Therefore, the interval of the axial gap 32 can be easily adjusted merely by changing the amount of screwing of the male screw portion 48 with respect to the female screw portion 46. As a result, the work of adjusting the interval of the axial gap 32 can be simplified.

For example, in order to adjust the interval of the axial gap 32, it is conceivable to increase the processing accuracy of each component (the housing 22, the installation member 36, the circuit board 42, or the like) of the rotation detection device 10. Compared to this, according to the present embodiment, it is possible to reduce the processing cost without increasing the processing accuracy of each component.

In addition to this, for the interval adjustment of the axial gap 32, means for disposing a shim for the interval adjusting between two components (for example, the installation member 36 and the detection unit 40) of the rotation detection device 10 is also conceivable. In this case, a series of steps of the assembly of the rotation detection device 10, the measurement of the interval of the axial gap 32, the disassembly of the rotation detection device 10, and the disposition of the shim are required. In this regard, according to the present embodiment, the interval of the axial gap 32 can be adjusted merely by changing the amount of screwing of the screw mechanism 50 without disassembling the rotation detection device 10. Therefore, compared to the case of using the shim, the work of adjusting the interval of the axial gap 32 can be simplified, and the manufacturing cost of the shim can also be reduced.

The rotation detection device 10 includes the fixing member 60 that fixes the housing 22 and the installation member 36 such that they cannot rotate relative to each other. Therefore, the housing 22 and the installation member 36 can be reliably fixed by the fixing member 60 with the interval after the adjustment by the screw mechanism 50.

The fixing member 60 is an insertion member that is inserted into the housing 22 and the installation member 36. Therefore, the housing 22 and the installation member 36 can be fixed so as not to be rotatable relative to each other with a simple configuration of merely inserting the insertion member into the housing 22 and the installation member 36.

(B) The installation member 36 of the present embodiment is provided with the long hole 70 as the insertion hole 62B. Therefore, the housing 22 and the installation member 36 can be fixed by the fixing member 60 inserted into the insertion holes 62A and 62B while allowing large variation in the relative position of each insertion hole 62A or 62B in the longitudinal direction of the long hole 70.

In this manner, the long hole 70 is provided in order to widen the permissible variation amount of the relative position of each insertion hole 62A or 62B (hereinafter referred to as the allowable variation amount) when the fixing member 60 is inserted into the insertion holes 62A and 62B while causing the insertion holes 62A and 62B to overlap in the radial direction. This allowable variation amount can be widened in the longitudinal direction of the long hole 70, compared to a case where the insertion hole that becomes the long hole 70 is a round hole (a round hole having the same diameter as an inscribed circle that inscribes the long hole 70 when viewed from the radial direction).

(C) At least one of the first mounting portion 66A and the second mounting portion 66B is provided in a plurality. Therefore, the number of fixable positions can be increased compared to a case where each of the mounting portions 66A and 66B is only one. Accordingly, the interval adjustment width of the axial gap 32 described above can be reduced, and the interval of the axial gap 32 can be finely adjusted.

(D) The mounting portions 66A or 66B of one of the housing 22 and the installation member 36 are provided at equiangular intervals. In this way, the switching rotation angle θ becomes constant, the interval adjustment width of the axial gap 32 can be brought closer to a constant value, and accurate interval adjustment work can be realized.

Figure 8:
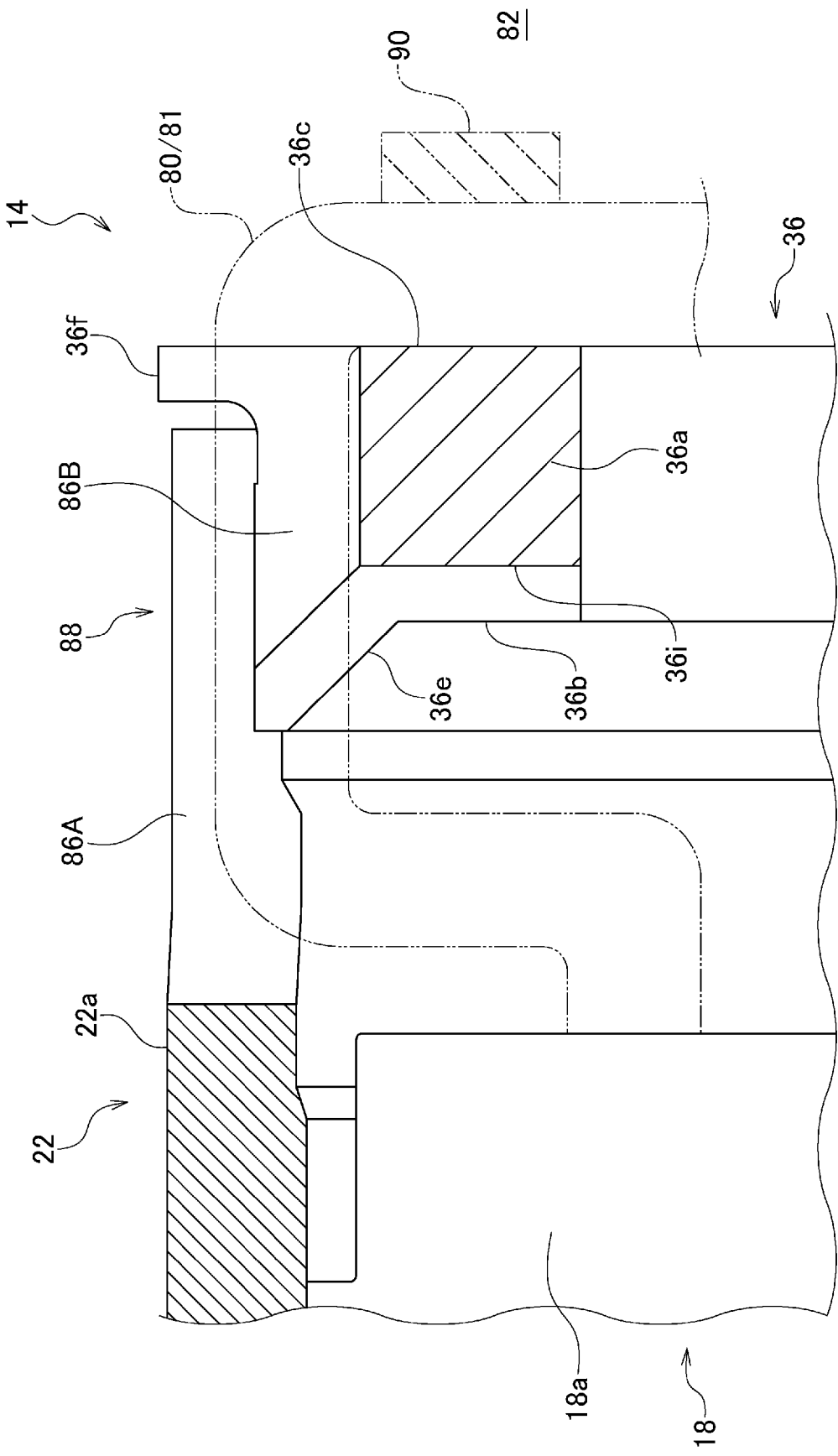
FIG. 8 is a sectional view around part B in FIG. 3.
Figure 9A:
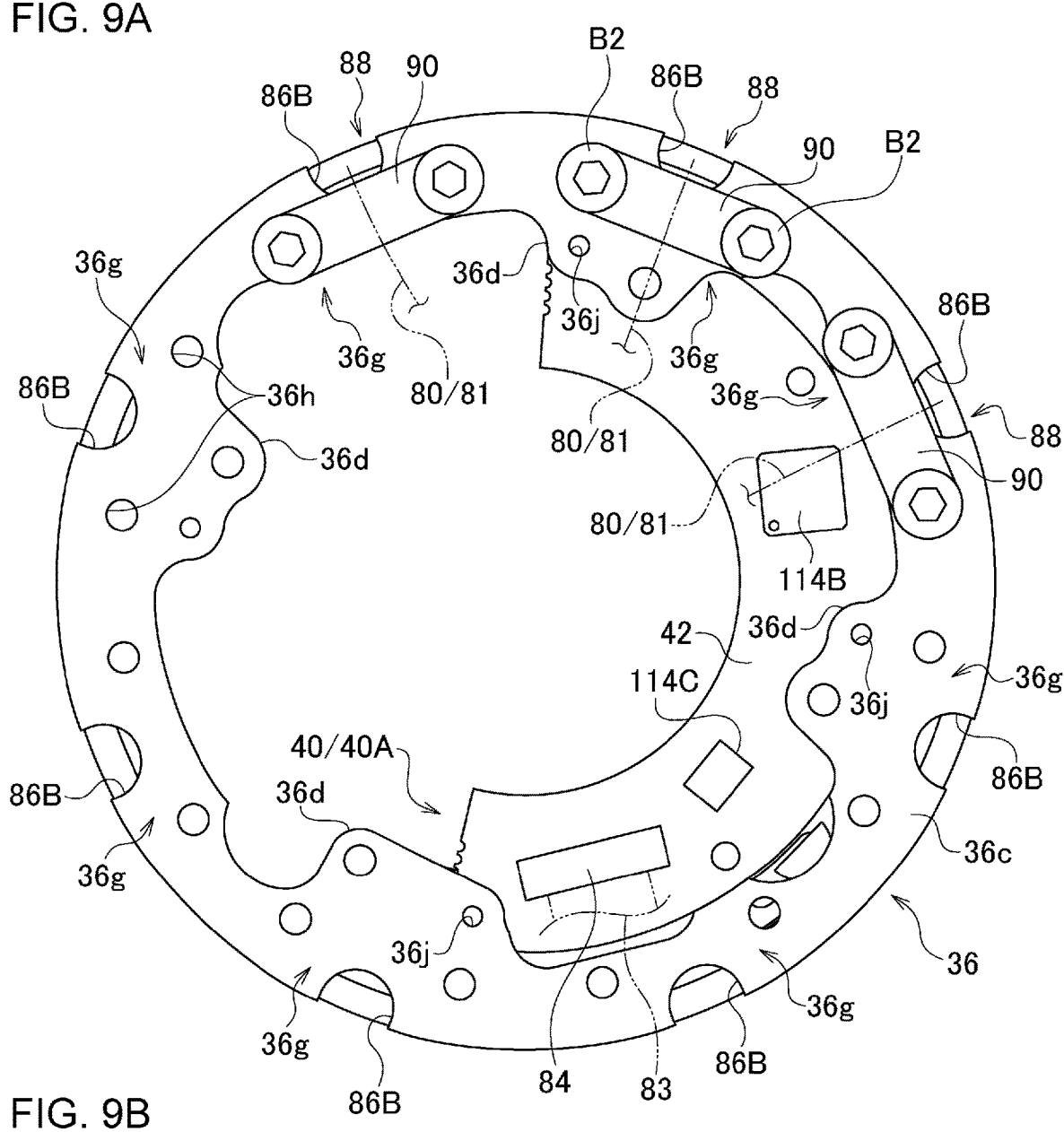
FIG. 9A is a front view of the rotation detection device of one embodiment.
Figure 9B:
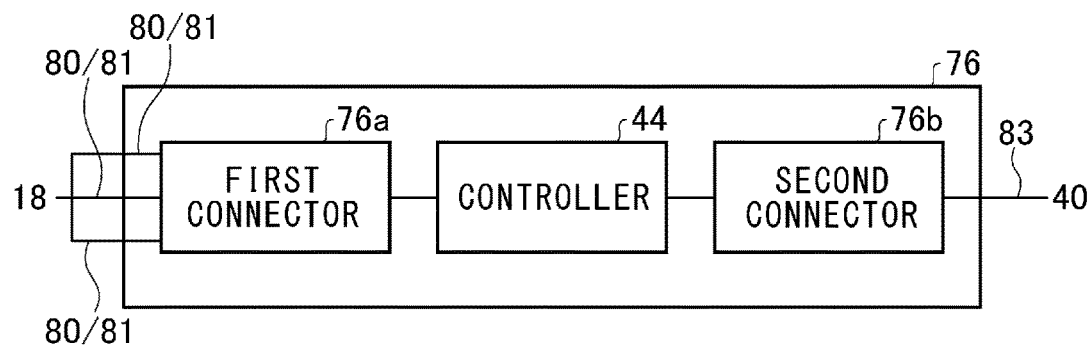
FIG. 9B is a functional block diagram of a control unit.
Figure 10:
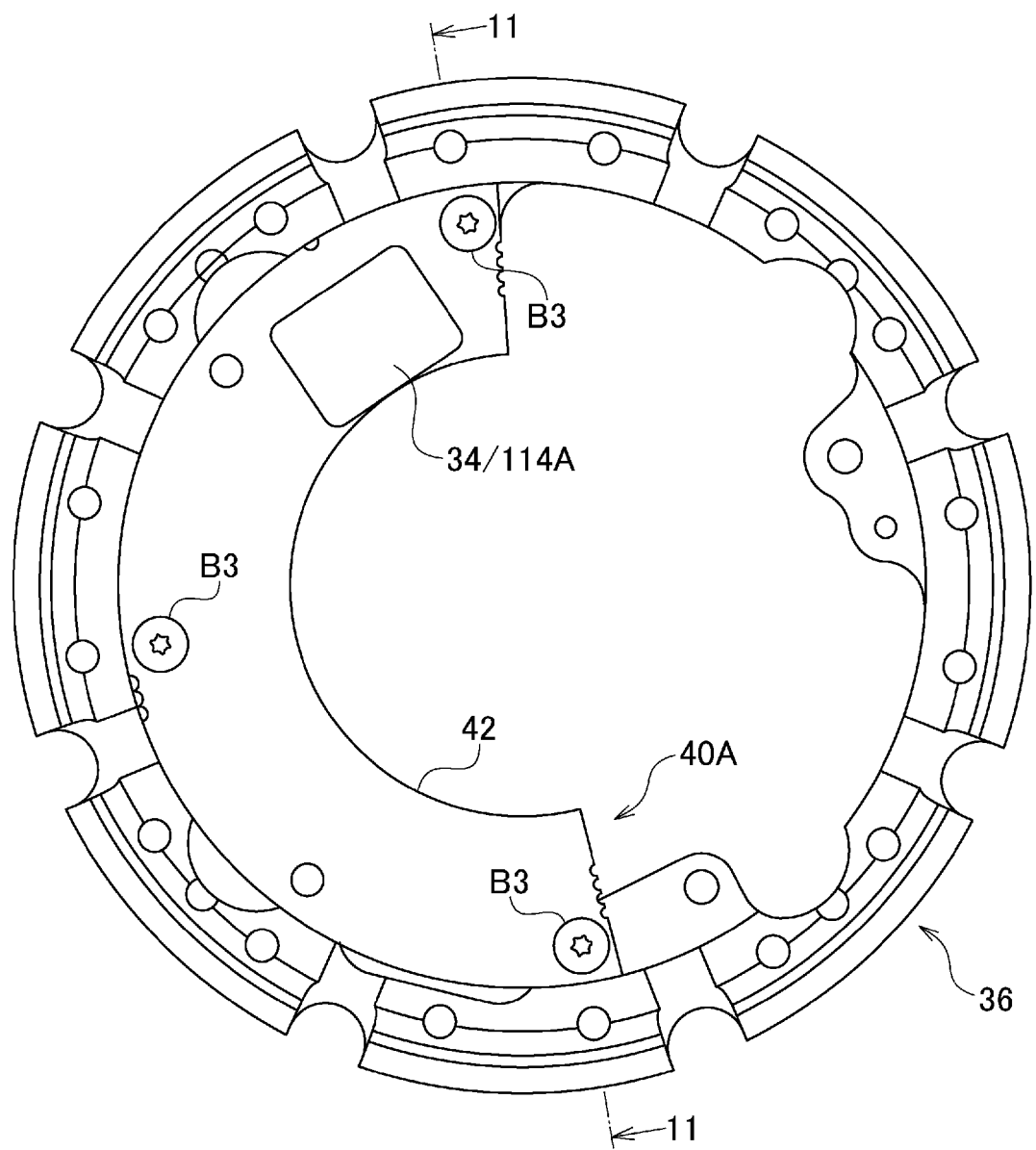
FIG. 10 is a rear view showing a first detection unit and the installation member.
Figure 11:
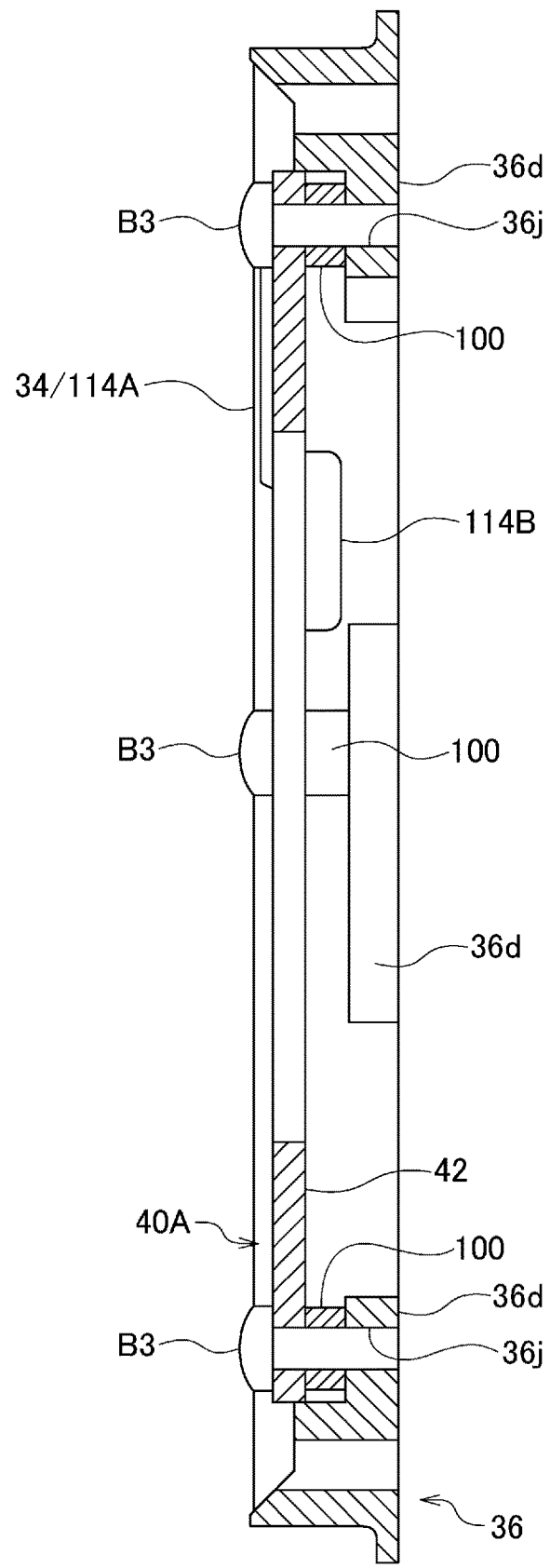
FIG. 11 is a sectional view taken along line 11-11 in FIG. 10.

Next, other features of the rotation detection device 10 will be described. FIGS. 8, 9A, and 9B are referred to. FIG. 8 is a sectional view taken along line 8-8 in FIG. 6. The rotary machine 14 includes a plurality of first wires 80 that connect first electric equipment which is disposed inside the housing 22 and second electric equipment which is disposed outside the housing 22. In FIG. 3 and the like, the first wire 80 is omitted. In FIGS. 9A and 9B, the first wire 80 is shown using only the center line of the first wire 80. The plurality of first wires 80 of the present embodiment are motor wires 81 which are connected to the motor 18 that is the first electric equipment. The motor wires 81 are connected to a coil (not shown) of the stator 18a of the motor 18, for example. The motor wire 81 is individually provided corresponding to each phase (here, three phases of U, V, and W) of the coil, and serves as an energization path to the corresponding phase. In the present embodiment, a total of three motor wires 81 are provided.

In the present embodiment, the motor wires 81 are electrically connected to a controller 44 of a control unit 76, which is the second electric equipment. The control unit 76 includes the controller 44 that controls the rotary machine 14. The controller 44 is, for example, a control IC that is mounted on a circuit board (not shown). The controller 44 can control the rotary machine 14 by driving the motor 18 by using a driver circuit. The controller 44 can drive the motor 18 by supplying electric power through the motor wires 81. The controller 44 is electrically connected to the detection part 34 of the detection unit 40 through a second wire 83. The detection part 34 outputs a detection value, which is its own detection result, to the controller 44. The controller 44 drives the motor 18, based on the detection value of the detection part 34. The controller 44 of the present embodiment performs feedback-control to drive the motor 18 such that the detection value of the detection part 34 (for example, the rotation angle of the rotating body 12) approaches a target value.

Although not shown in the drawings, the control unit 76 is provided integrally with the installation member 36 outside the detection unit 40 in the axial direction, for example. In addition to this, the control unit 76 may be provided separately from the rotation detection device 10. The control unit 76 includes a first connector 76a to which the first wires 80 (the motor wires 81) are mechanically connected, and a second connector 76b to which the second wire 83 is mechanically connected. The second wire 83 is mechanically connected to a third connector 84 (refer to FIG. 3 as well) provided on the circuit board 42 of the detection unit 40.

The plurality of wires 80 are mechanically connected to the first connector 76a of the control unit 76 by passing through the internal space of the housing 22, a wire passage 88 (described later), and an external space 82 outside the installation member 36 in the axial direction in this order. Alternatively, the motor 18 may be electrically connected to the controller 44 by providing the controller 44 in the detection unit 40 and mechanically connecting the controller 44 to the third connector 84 of the detection unit 40.

The housing 22 has a first wire hole 86A, and the installation member 36 has a second wire hole 86B. The first wire hole 86A is configured by a cutout hole that penetrates the first peripheral wall portion 22a of the housing 22 in the radial direction and is open toward the outside in the axial direction X of the housing 22. The second wire hole 86B is configured by a groove portion recessed inward in the radial direction in the outer peripheral portion of the second peripheral wall portion 36a of the installation member 36 and extending in the axial direction X. The second wire hole 86B of the present embodiment is formed not only in the second peripheral wall portion 36a of the installation member 36 but also in the flange portion 36f.

The first wire hole 86A and the second wire hole 86B form the wire passage 88 through which the wire 80 is extracted from the inside of the housing 22, when they are disposed at positions that overlap each other in the radial direction. The wire passage 88 is formed so as to extend continuously in the axial direction X by the first wire hole 86A of the housing 22 and the second wire hole 86B of the installation member 36.

In this manner, the wire passage 88 that is continuous in the axial direction X can be formed by the wire holes 86A and 86B of the housing 22 and the installation member 36. Therefore, compared to a case where the installation member 36 does not have the wire hole 86B, the outer diameter dimension of the entire rotation detection device 10 can be reduced in the axial range radially overlapping the wire 80 that passes through outside the housing 22 and the installation member 36 in the radial direction.

FIGS. 6 and 7 are referred to. The housing 22 and the installation member 36 are configured such that the second wire hole 86B overlaps the first wire hole 86A in the radial direction when being disposed at any of the plurality of fixable positions. In this way, the wire passage 88 can be formed between the first wire hole 86A and the second wire hole 86B at any fixable position, and the wire 80 can be extracted from the wire passage 88.

In order to realize this, the second wire holes 86B of the present embodiment are provided in the installation member 36 at the first equiangular interval (here, 45°) which is the same as the switching rotation angle θ for switching the fixable position. The second wire hole 86B is provided at each of a plurality of third equiangular position P3 (here, a total of eight third equiangular positions P3) obtained by equally dividing 360° at the first equiangular intervals. The plurality of third equiangular positions P3 are positions shifted in the circumferential direction from the plurality of second equiangular positions P2 at which the second mounting portions 66B are located. Further, the first wire holes 86A are provided at at least some fourth equiangular positions P4 among the plurality of fourth equiangular positions P4 spaced at the first equiangular interval which is the same as the switching rotation angle θ. The fourth equiangular positions P4 are positions obtained by equally dividing 360° at the first equiangular intervals. In the present embodiment, the first wire holes 86A are provided at three fourth equiangular positions P4, the number of which is the same as the number of the motor wires 81. The motor wire 81 passes through the wire passage 88 which is formed by the individual first wire hole 86A. The plurality of fourth equiangular positions P4 are positions shifted in the circumferential direction from the plurality of first equiangular positions P1 at which the first mounting portions 66A are located.

The second wire holes 86B of the installation member 36 described above are provided at the same equiangular intervals as those of the mounting portions 66A or 66B of either the housing 22 or the installation member 36. In the present embodiment, the plurality of second wire holes 86B are provided at the same first equiangular intervals (here, 45°) as those of the first mounting portions 66A of the housing 22. In this case, the plurality of first mounting portions 66A of the housing 22 and the plurality of second wire holes 86B, which are provided at the same equiangular intervals, are provided at positions shifted in the circumferential direction without overlapping in the radial direction. In addition of this, the second wire holes 86B may be provided at the same equiangular intervals as those of the second mounting portions 66B of the installation member 36.

FIGS. 8, 9A, and 9B are referred to. The detection unit 40 includes a wire fixing member 90 (refer to FIG. 3 as well) that fixes the wire 80 to the installation member 36. The wire fixing member 90 is disposed on the side opposite to the housing 22 with respect to the installation member 36 in the axial direction and attached to the outer side surface portion 36c of the installation member 36. The installation member 36 has an attachment portion 36g for attaching the wire fixing member 90 thereon. The attachment portion 36g has an attachment hole 36h for attaching the wire fixing member 90 with a bolt B2. The attachment hole 36h of the present embodiment is a female screw hole, and the wire fixing member 90 can be detachably attached to the installation member 36 by screwing the bolt B2 penetrating the wire fixing member 90 into the attachment hole 36h. The wire fixing member 90 of the present embodiment is a clamp that fixes the wire 80 to the installation member 36 by clamping the wire 80. In order to realize this, the wire fixing member 90 of the present embodiment clamps the wire 80 between itself and the installation member 36. In addition to this, the wire fixing member 90 may clamp the wire 80 by the wire fixing member 90 itself.

In this way, in a case where an unintended external force is applied to the wire 80, the wire fixing member 90 can resist the external force. As a result, it is possible to prevent the wire 80 from being detached from a mating member to which the wire 80 is connected. In particular, in a case of being in an environment where the wire 80 is exposed to the outside as in the present embodiment, an unintended external force is easily applied to the wire 80, and therefore, this is effective as a countermeasure. The mating member as referred to herein refers to the motor 18 (the stator 18a) and the control unit 76 in the present embodiment.

The installation member 36 is provided with a plurality of attachment portions 36g, the number of which is the same as the number of second wire holes 86B. The plurality of attachment portions 36g are individually provided corresponding to the plurality of second wire holes 86B of the installation member 36. The plurality of attachment portions 36g are provided at positions where the wire fixing members 90 can be attached to the radial inside of the corresponding second wire holes 86B when viewed in the axial direction X.

In this way, even in a case where the wire 80 is extracted from any of the second wire holes 86B, the wire 80 can be fixed to the installation member 36 by attaching the wire fixing member 90 to the attachment portion 36g corresponding to the second wire hole 86B. Further, in a case where the number of the second wire holes 86B through which the wires 80 are extracted is plural, each of the wires 80 which are extracted from the individual second wire holes 86B can be fixed to the installation member 36 by attaching the wire fixing members 90, the number of which is the same as the number of second wire holes 86B to the installation member 36.

A cutout portion 36i extending inward in the radial direction from the axially inner end portion of the second wire hole 86B is formed in the inner side surface portion 36b on the axially inner side of the installation member 36. In this way, it is not necessary to form an edge portion between the tapered portion 36e of the inner side surface portion 36b of the installation member 36 and the second wire hole 86B, so that it is possible to avoid contact between the edge portion and the wire 80 passing through the second wire hole 86B.

Next, an outline of the interval adjustment work using the rotation detection device 10 described above will be described. First, a wire extracting process of extracting the wire 80 from the inside of the housing 22 through the first wire hole 86A is performed. Next, a temporary fixing process of temporarily fixing the installation member 36 to the housing 22 by screwing the male screw portion 48 into the female screw portion 46 is performed. Next, an interval adjusting process of adjusting the interval of the axial gap 32 within a target interval range is performed. After the interval adjusting process, a first fixing process of fixing the housing 22 and the installation member 36 by using the fixing member 60 is performed. Further, after the interval adjusting process, a second fixing process of fixing the wire 80 to the installation member 36 by using the wire fixing member 90 is performed before or after the first fixing process. In the second fixing process, the wire 80 extracted from the first wire hole 86A is extracted in advance through the wire passage 88 formed by the first wire hole 86A and the second wire hole 86B. The interval adjustment work is completed by performing a series of processes described above.

In the interval adjusting process described above, the interval of the axial gap 32 may be measured using an interval gauge or the like in order to determine whether or not the interval of the axial gap 32 is within the target interval range. In addition to this, the signal strength of the electric signal detected by the detection part 34 (a sensor element) may be measured while the rotating body 12 is being rotated. This may be realized, for example, by connecting the control unit 76 and an external terminal and executing a dedicated measurement program by the external terminal. This external terminal is electrically connected to the controller 44 of the control unit 76 through a cable connected to the control unit 76. This measurement program can execute an instruction function of instructing the controller 44 of the control unit 76 to rotate the rotating body 12 and a measurement function of measuring the signal strength of the electric signal detected by the detection part 34. In this case, in a case where the signal strength of the electric signal is within a target intensity range, it is determined that the interval of the axial gap 32 is within the target interval range.

Next, other features relating to the installation member 36 will be described. FIGS. 9A, 9B, 10, and 11 are referred to. A first type of detection unit 40A (hereinafter also referred to as a first detection unit 40A) can be installed on the installation member 36. A first installation hole 36*j* for installing the first detection unit 40A is provided in the installed portion 36*d* of the installation member 36. In the present embodiment, the first installation hole 36*j* is a female screw hole. A plurality of installed portions 36*d* of the installation member 36 are provided at intervals in the circumferential direction.

The first detection unit 40A is the detection unit described so far. The first detection unit 40A is disposed at a position overlapping the axial inside (the detected part 30 side) with respect to the plurality of installed portions 36*d* of the installation member 36. A spacer 100 (here, a bush) is disposed between the circuit board 42 of the first detection unit 40A and the installed portion 36*d* of the installation member 36. The first detection unit 40A is installed on the installation member 36 by fastening the spacer 100 and the installation member 36 together with bolts B3. The bolt B3 of the present embodiment is screwed into the first installation hole 36*j* (the female screw hole) of the installation member 36, and the head portion thereof is disposed inside the first detection unit 40A in the axial direction.

Figure 12:
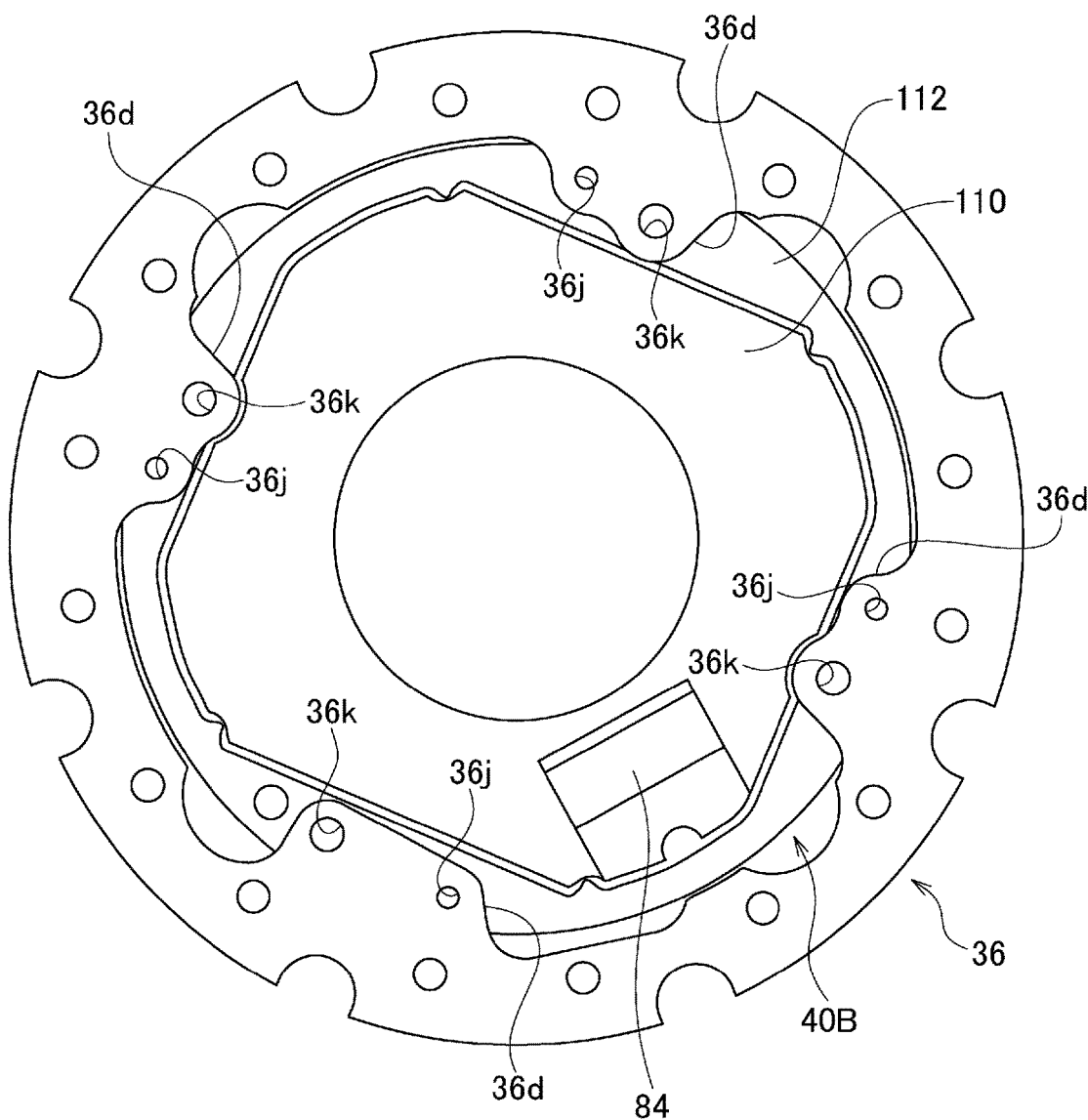
FIG. 12 is a front view showing a second detection unit and the installation member.
Figure 13:
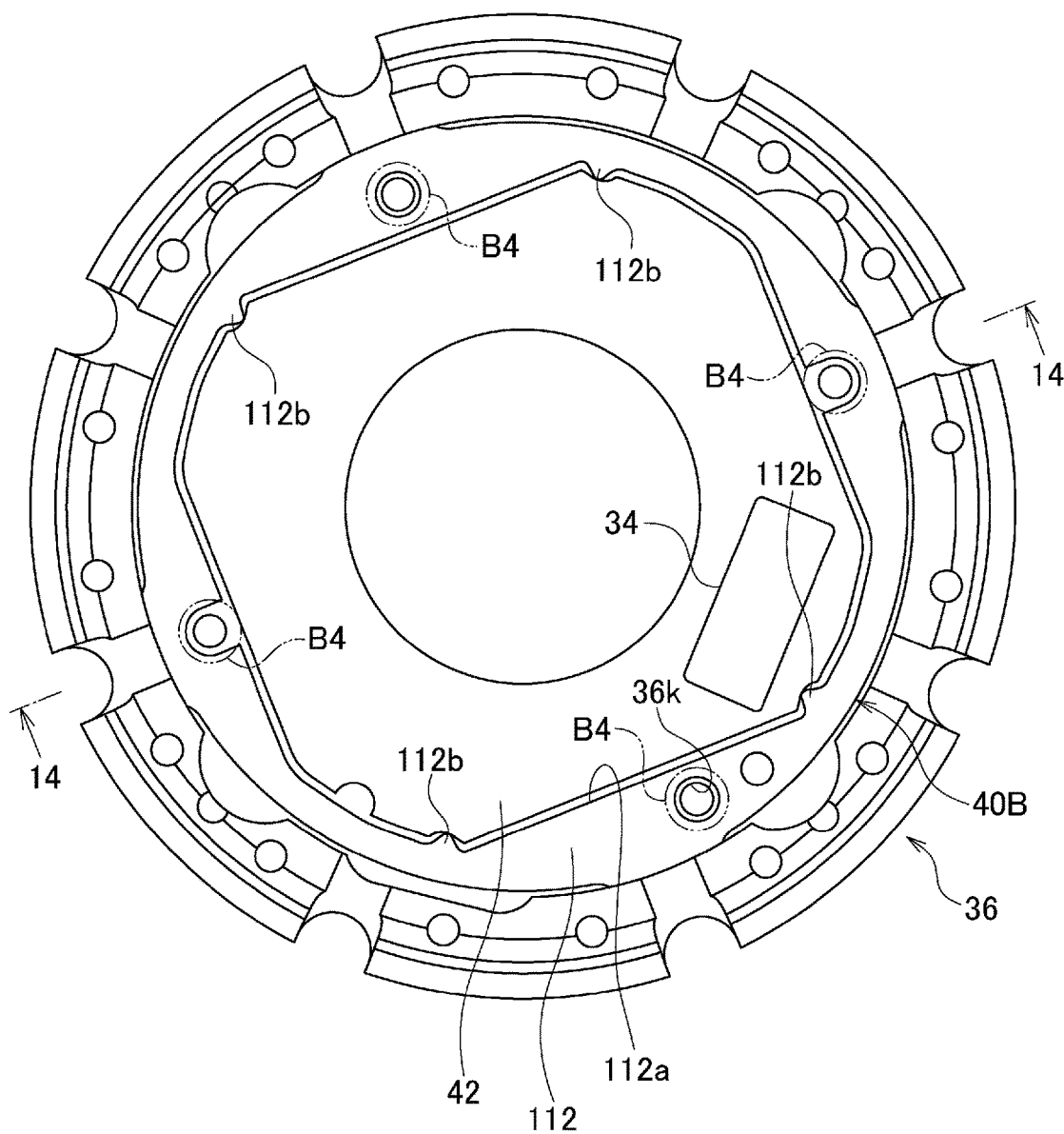
FIG. 13 is a rear view showing the second detection unit and the installation member.
Figure 14:
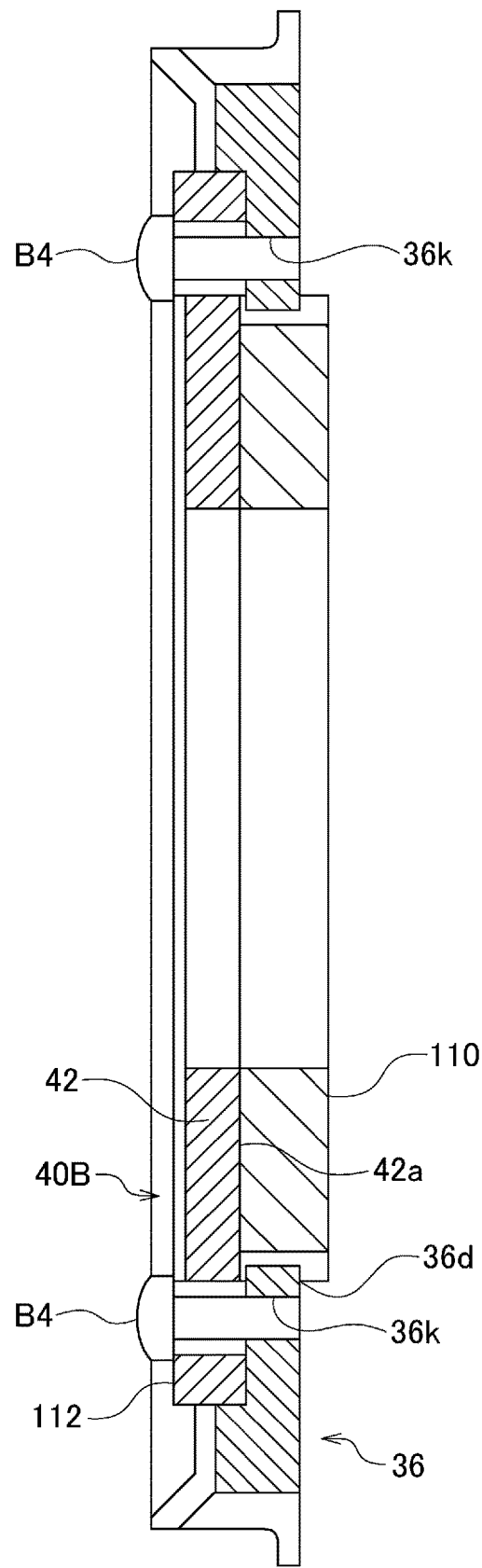
FIG. 14 is a sectional view taken along line 14-14 in FIG. 13.

FIGS. 12 to 14 are referred to. In addition to the first detection unit 40A, a second type of detection unit 40B (hereinafter also referred to as a second detection unit 40B) having a different configuration from the first detection unit 40A can also be installed on the installation member 36. A second installation hole 36*k* for installing the second detection unit 40B is provided in the installed portion 36*d* of the installation member 36. In the present embodiment, the second installation hole 36*k* is a female screw hole. In the present embodiment, the inner diameter of one (here, the first installation hole 36*j*) of the first installation hole 36*j* and the second installation hole 36*k* is smaller than the inner diameter of the other (here, the second installation hole 36*k*).

The second detection unit 40B includes, in addition to the detection part 34 and the circuit board 42, a cover 110 that covers an outer side surface portion 42*a* on the axially outer side (the side opposite to the detected part 30) of the circuit board 42 from the axially outer side, and a frame 112 that supports the circuit board 42. The cover 110 is attached to the circuit board 42 by bonding or the like, for example. The cover 110 has a role of protecting electronic components (not shown) mounted on the outer side surface portion 42*a* of the circuit board 42. The frame 112 has a through-hole 112*a* penetrating the frame 112, and the circuit board 42 is disposed inside the through-hole 112*a*. The circuit board 42 is attached to the frame 112 by, for example, biting an edge portion 112*b* provided on the inner peripheral surface of the through-hole 112*a* of the frame 112.

The second detection unit 40B is disposed at a position overlapping the axial inside with respect to the plurality of installed portions 36*d* of the installation member 36. The second detection unit 40B is installed on the installation member 36 by fastening the frame 112 and the installation member 36 together with a bolt B4. The bolt B4 of the present embodiment is screwed into the second installation hole 36*k* of the installation member 36, and the head portion thereof is disposed inside the second detection unit 40B in the axial direction.

In this manner, both the first detection unit 40A and the second detection unit 40B can be installed on the common installation member 36. Further, although not shown in the drawings, the rotation detection device 10 can adjust the axial gap 32 even in a case where any of the first detection unit 40A and the second detection unit 40B is installed on the installation member 36. Therefore, when the different detection units 40 are used in the rotation detection device 10, the installation member 36 can be shared. As a result, the number of parts can be reduced in the rotation detection device 10 using the different detection units 40.

It is sufficient if the first type of detection unit 40 and the second type of detection unit 40 are different in configuration, and specific examples thereof are not particularly limited. Further, in the rotation detection device 10 using the different detection units 40, in addition to the installation member 36, the housing 22 and the detected part 30 may be shared. In a case of being viewed as the rotary machine 14 provided with the rotation detection device 10, it can be said that the rotary machine 14 may share the configurations other than the detection unit 40. In addition to this, different types of detected parts 30 may be used in a case where the first type of detection unit 40 is used and a case where the second type of detection unit 40 is used. For example, in a case where the first detection unit 40A is used, a first type of detected part 30 may be used, and in a case where the second detection unit 40B is used, a second type of detected part 30 having a different configuration from the first type of detected part 30 may be used.

FIGS. 9A to 11 are referred to. The circuit board 42 includes the outer side surface portion 42*a* that is located on the axially outer side (the side opposite to the detected part 30), and an inner side surface portion 42*b* that is located on the axially inner side (the detected part 30 side). Only a first electronic component 114A (a sensor IC) configuring the detection part 34 is mounted on the inner side surface portion 42*b*, and other electronic components 114B and 114C are mounted on the outer side surface portion 42*a* of the circuit board 42. The other electronic components 114B and 114C include the electronic component 114B whose height dimension in the thickness direction (the axial direction X) of the circuit board 42 is larger than that of the first electronic component 114A. In this way, the circuit board 42 can be brought closer to the detected part 30, compared to a case where the first electronic component 114A and the other electronic components 114B and 114C are mounted on the same inner side surface portion 42b, and the axial dimension of the rotation detection device 10 can be reduced accordingly.

Another Embodiment

Figure 15:
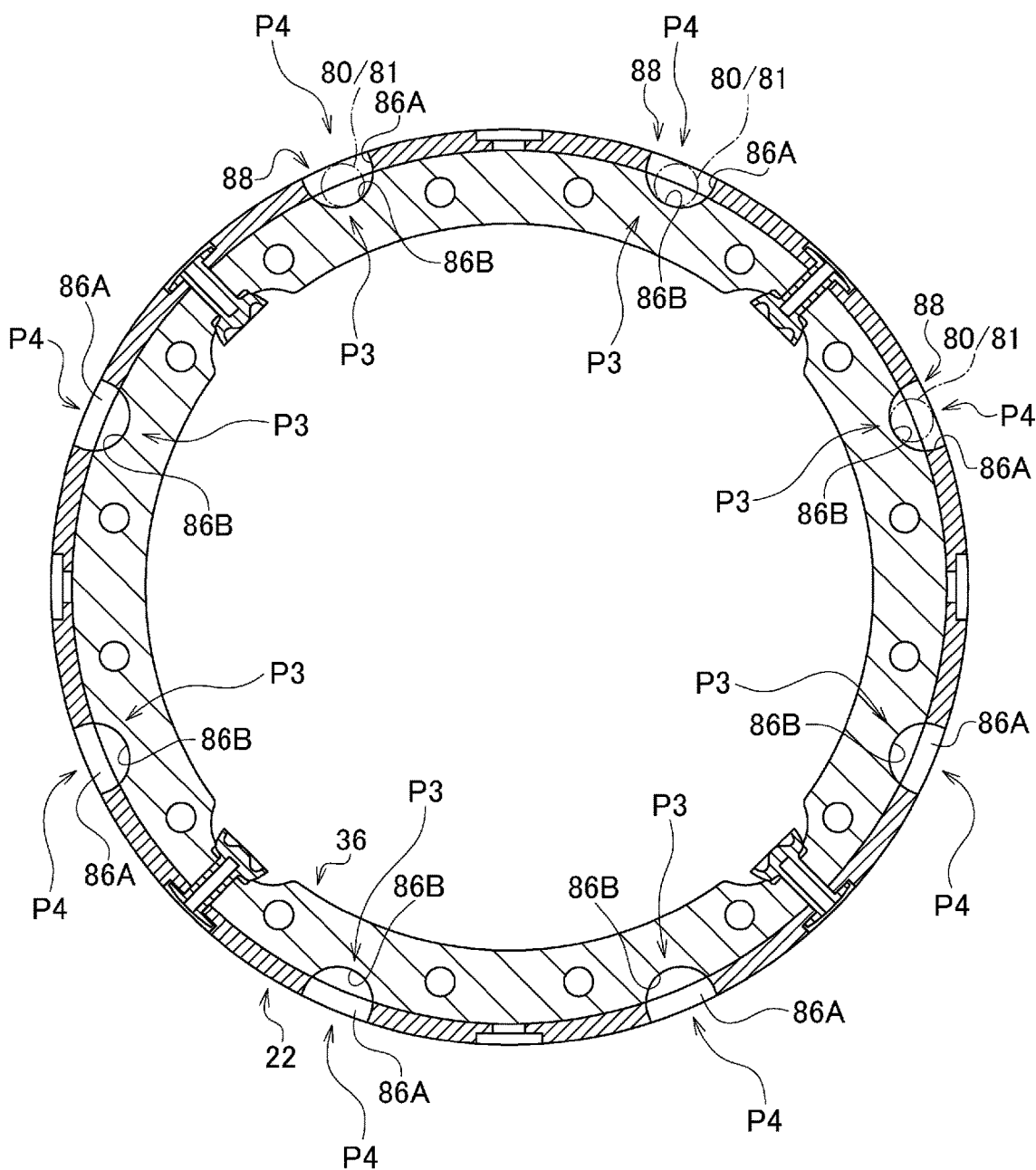
FIG. 15 is a sectional view of a rotation detection device of another embodiment as viewed from the same viewpoint as in FIG. 6.

FIG. 15 is referred to. The number of motor wires 81 of the present embodiment is three, as in one embodiment. The number of wire holes 86A or 86B of each of the housing 22 and the installation member 36 of the present embodiment is larger than the number of motor wires 81. In order to realize this, in the present embodiment, each of the number of first wire holes 86A and the number of second wire holes 86B is eight. In the present embodiment, the second wire holes 86B are provided in the installation member 36 at the first equiangular interval (here, 45°) which is the same as the switching rotation angle θ described above, and the first wire holes 86A are also provided in the housing 22 at the first equiangular interval. The second wire hole 86B is provided at each of the plurality of (eight) third equiangular positions P3 described above, and the first wire hole 86A is provided at each of the plurality of (eight) fourth equiangular positions P4 described above. In this way, even when being disposed at any of the plurality of fixable positions, more wire passages 88 than the number of motor wires 81 can be formed.

With the above configuration, compared to a case where the number of wire holes 86A or 86B is equal to or less than the number of motor wires 81, it is possible to increase the option of the wire passages 88 that can be actually used. Therefore, for example, according to a peripheral structure of the rotation detection device 10, the wire passage 88 to be used can be flexibly changed by extracting the motor wire 81 from the wire passage 88 that does not easily interfere with the peripheral structure, among the plurality of wire passages 88.

In this manner, the magnitude relationship between the number of wire holes 86A or 86B of each of the housing 22 and the installation member 36 and the number of motor wires 81 is not particularly limited. In addition to this, the number of wire holes 86A or 86B of each of the housing 22 and the installation member 36 may be smaller than the number of motor wires 81. In this case, a plurality of motor wires 81 may be routed through one wire hole 86A or 86B. Further, the motor wire 81 and the other wire 80 may be routed through one wire hole 86A or 86B.

Next, modification forms of each component described so far will be described.

A specific example of the rotary machine 14 in which the rotation detection device 10 is used is not limited to an actuator. The rotary machine 14 may be, for example, a motor device that includes the motor 18 without the reduction gear 20. In this case, the rotary machine 14 may be a servomotor device that performs feedback-control, based on the detection value of the rotary encoder (the detection part 34), as in the embodiments.

A specific example of the rotating body 12 is not particularly limited. The rotating body 12 may be, instead of the rotor shaft 16, for example, a rotary shaft that can rotate integrally with an output shaft of the reduction gear 20 and that penetrates the rotor shaft 16 and the output shaft.

A specific example of the type of the reduction gear 20 is not particularly limited. For example, a bending meshing type reduction gear, an eccentric oscillation type reduction type reduction gear, a simple planetary type reduction gear, or the like may be used. The type of the bending meshing type reduction gear is not particularly limited and may be, for example, a tubular type, a silk hat type, a cup type, or the like. The type of the eccentric oscillation type reduction gear is not particularly limited and may be, for example, a center crank type in which a crankshaft is disposed on the center line of an internal gear, a distribution type in which a crankshaft is disposed at a position offset from the center line, or the like.

The plurality of wires 80 may include different types of wires that are connected to different first electric equipment from the motor 18. The different first electric equipment as referred to herein refers to at least one of, for example, a sensor (a temperature sensor, a pressure sensor, or the like), a brake, and the like.

In relation to the effect of (A), it is sufficient if one of the housing 22 and the installation member 36 is provided with the female screw portion 46 and the other is provided with the male screw portion 48. Unlike the embodiments, the female screw portion 46 may be provided in the inner peripheral portion of the second peripheral wall portion 36a of the installation member 36, and the male screw portion 48 may be provided in the outer peripheral portion of the first peripheral wall portion 22a of the housing 22. In this case, the male screw portion 48 may be provided in the outer peripheral portion of the counter load side opening end portion in the first peripheral wall portion 22a of the housing 22.

The rotation detection device 10 does not need to include the fixing member 60. The rotation detection device 10 may include a cover that covers the installation member 36 in order to prevent variation in the interval of the axial gap 32.

A specific example of the fixing member 60 is not limited to an insertion member. The fixing member 60 may be, for example, a clamp, a wedge, or the like. In a case where the fixing member 60 is an insertion member (a fastening member), a specific example of the fixing member 60 is not particularly limited, and for example, a combination of a bolt and a nut, a bolt, or the like may be used in addition to a rivet. In a case where the fixing member 60 includes a bolt, the insertion hole on the inner side out of the first insertion hole 62A and the second insertion hole 62B may be a female screw hole into which the bolt is screwed.

An example has been described in which the fixing member 60 can fix the housing 22 and the installation member 36 only in a case where they are at specific relative positions in the circumferential direction (fixable position). In addition to this, the fixing member 60 may be capable of fixing the housing 22 and the installation member 36 which are at any relative positions in the circumferential direction. In this case, unlike the embodiments, the rotation detection device 10 can steplessly adjust the interval of the axial gap 32. This may be realized, for example, in a case where a clamp, a wedge, or the like is used for the fixing member 60.

In relation to the effect of (B), it is sufficient if the long hole 70 is provided in at least one of the housing 22 and the installation member 36. It can be said that it is sufficient if at least one of the first insertion hole 62A and the second insertion hole 62B is the long hole 70. The direction (longitudinal direction) in which the long hole 70 extends is not particularly limited, and may be, for example, a helical direction along the screw thread of the screw mechanism 50.

The number of first mounting portions 66A and the number of second mounting portions 66B are not particularly limited. Each of the first mounting portion 66A and the second mounting portion 66B may be only one, or may be any number of two or more.

In relation to the effect of (C), it is sufficient if a plurality of mounting portions 66A or 66B of at least one of the housing 22 and the installation member 36 are provided at intervals in the circumferential direction. For example, the housing 22 may be provided with a plurality of (for example, eight) first mounting portions 66A and the installation member 36 may be provided with a single second mounting portion 66B, and vice versa. Further, the plurality of mounting portions 66A and the plurality of mounting portions 66B may be provided at any angular interval instead of being provided at equiangular intervals.

In relation to the effect of (D), the second mounting portions 66B may be provided in the installation member 36 at the first equiangular interval which is the same as the switching rotation angle θ. In this case, in the housing 22, the first mounting portions 66A may be provided at at least some equiangular positions among the plurality of equiangular positions spaced at the first equiangular intervals. It can be said that it is sufficient if the mounting portions 66A or 66B are provided at equiangular intervals in one of the housing 22 and the installation member 36.

Further, only one of the housing 22 and the installation member 36 may be provided with the wire holes 86A or 86B, or both of them do not need to be provided with the wire holes 86A and 86B. The wire holes 86B of the installation member 36 do not need to be provided at the same equiangular intervals as those of the mounting portions of any of the housing 22 and the installation member 36.

The rotation detection device 10 does not need to include the wire fixing member 90.

Only one of different types of detection units 40 may be capable of being installed on the installation member 36.

The embodiments and modification forms described above are exemplification. The technical ideas that abstract these should not be construed as being limited to the contents of the embodiments and modification forms. Many design changes such as a change, addition, and deletion of a component are possible with respect to the contents of the embodiments and modification forms. In the embodiments described above, the notation of "embodiment" is added to emphasize the contents that allow such design changes. However, design changes are permitted even in the contents in which there is no such notation. The hatching attached to the cross section of the drawing does not limit the material of the hatched object. Structures and numerical values as mentioned in the embodiments and modification forms also naturally include those that can be regarded as the same when manufacturing errors are considered.

A component configured with a single member in an embodiment may be configured with a plurality of members. Similarly, a component configured with a plurality of members in an embodiment may be configured with a single member.

It should be understood that the invention is not limited to the above-described embodiment, but may be modified into various forms on the basis of the spirit of the invention. Additionally, the modifications are included in the scope of the invention.

What is claimed is:

1. A rotation detection device comprising:
a housing that accommodates a rotating body;
a detected part that rotates integrally with the rotating body;
a detection part that faces the detected part in an axial direction with an axial gap interposed therebetween;
an installation member on which the detection part is installed;
a female screw portion that is provided in one of the housing and the installation member;
a male screw portion that is provided in the other of the housing and the installation member and screwed into the female screw portion; and
a fixing member that fixes the housing and the installation member such that the housing and the installation member are not rotatable relative to each other, in a state where the axial gap is provided between the detected part and the detection part.

2. The rotation detection device according to claim 1, wherein the fixing member is an insertion member that is inserted into the housing and the installation member.

3. The rotation detection device according to claim 2, wherein at least one of the housing and the installation member is provided with a long hole into which the fixing member is inserted.

4. The rotation detection device according to claim 1, wherein each of the housing and the installation member is provided with a mounting portion for mounting the fixing member, and
a plurality of the mounting portions of at least one of the housing and the installation member are provided at intervals in a circumferential direction.

5. The rotation detection device according to claim 4, wherein the mounting portions of one of the housing and the installation member are provided at equiangular intervals.

6. The rotation detection device according to claim 1, further comprising:
a wire fixing member for fixing a wire to the installation member.

7. A rotation detection device comprising:
a housing that accommodates a rotating body;
a detected part that rotates integrally with the rotating body;
a detection part that faces the detected part in an axial direction with an axial gap interposed therebetween;
an installation member on which the detection part is installed;
a female screw portion that is provided in one of the housing and the installation member; and
a male screw portion that is provided in the other of the housing and the installation member and screwed into the female screw portion,
wherein a wire hole for forming a wire passage for extracting a wire from an inside of the housing is provided in each of the housing and the installation member.

8. The rotation detection device according to claim 7, wherein the wire is a motor wire, and
a number of the wire holes of each of the housing and the installation member is greater than the number of the motor wires.

9. The rotation detection device according to claim 7, wherein mounting portions for mounting a fixing member that fixes the housing and the installation member are provided at equiangular intervals in one of the housing and the installation member, and the installation member is provided with a plurality of the wire holes at the same equiangular intervals as those of the mounting portions of either the housing or the installation member.

10. The rotation detection device according to claim 7, wherein the housing and the installation member are capable of being fixed by a fixing member when relative positions in a circumferential direction of the housing and the installation member are disposed at any of a plurality of fixable positions, and the installation member and the housing are configured such that the wire hole of the installation member overlaps the wire hole of the housing in a radial direction when the installation member and the housing are disposed at any of the plurality of fixable positions.

11. A rotation detection device comprising:

a housing that accommodates a rotating body;

a detected part that rotates integrally with the rotating body;

a detection part that faces the detected part in an axial direction with an axial gap interposed therebetween;

an installation member on which the detection part is installed;

a female screw portion that is provided in one of the housing and the installation member;

a male screw portion that is provided in the other of the housing and the installation member and screwed into the female screw portion; and a detection unit that includes the detection part, wherein both a first type of the detection unit and a second type of the detection unit having a different configuration from the first type of the detection unit are capable of being installed on the installation member, and in the rotation detection device, even in a case where any of the first type of the detection unit and the second type of the detection unit is installed on the installation member, an amount of screwing of the male screw portion into the female screw portion is capable of being changed.

* * * * *